(12) United States Patent
Bryant et al.

(10) Patent No.: US 7,583,589 B2
(45) Date of Patent: *Sep. 1, 2009

(54) COMPUTING REPAIR PATH INFORMATION

(75) Inventors: Stewart Frederick Bryant, Redhill (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 11/724,756

(22) Filed: Mar. 15, 2007

(65) Prior Publication Data

US 2008/0225697 A1  Sep. 18, 2008

(51) Int. Cl.
- *G06F 11/00* (2006.01)
- *G08C 15/00* (2006.01)
- *H04L 12/28* (2006.01)
- *H04L 12/56* (2006.01)

(52) U.S. Cl. .................. 370/216; 370/217; 370/252; 370/253; 370/389; 370/392

(58) Field of Classification Search ................. 370/217, 370/216, 389, 392, 252, 253
See application file for complete search history.

(56) References Cited

U.S. PATENT DOCUMENTS

| | | | |
|---|---|---|---|
| 6,032,194 A | 2/2000 | Gai et al. | |
| 6,697,325 B1 | 2/2004 | Cain | |
| 6,944,131 B2 | 9/2005 | Beshai et al. | |
| 7,058,016 B1 | 6/2006 | Harper | |
| 7,177,295 B1 | 2/2007 | Sholander et al. | |
| 2002/0093954 A1 | 7/2002 | Weil et al. | |
| 2005/0007950 A1 | 1/2005 | Liu | |
| 2005/0047353 A1* | 3/2005 | Hares | 370/255 |
| 2006/0013125 A1* | 1/2006 | Vasseur et al. | 370/217 |
| 2006/0291446 A1 | 12/2006 | Caldwell et al. | |
| 2007/0011351 A1 | 1/2007 | Bruno et al. | |
| 2007/0248016 A1* | 10/2007 | Ashwood Smith et al. | 370/238 |

OTHER PUBLICATIONS

Hedrick C, "Routing Information Protocol," IETF Network Working Group Request for Comments (RFC) 1058, published by The Internet Society, Jun. 1989, 27 pages.

Malkin G, "RIP Version 2 Carrying Additional Information," IETF NWG RFC 1723, published by The Internet Society, Nov. 1994, 8 pages.

* cited by examiner

*Primary Examiner*—Chi H Pham
*Assistant Examiner*—Farah Faroul
(74) *Attorney, Agent, or Firm*—Hickman Palermo Truong & Becker LLP

(57) ABSTRACT

An apparatus and method is described for computing repair path information around a failure component in a data communications network having a components nodes and links therebetween. Where, according to a routing protocol, a node sends to a neighbor node a metric indicative of reachability of a destination node, the protocol requiring differentiated action by the node if the route to the destination node includes the neighbor node, the apparatus is arranged to compute a repair path to the destination node via candidate nodes comprising only neighbor nodes to the apparatus not requiring differentiated action relative to the apparatus.

22 Claims, 5 Drawing Sheets

| DESTINATION 200 | COST 202 | COST 212 | COST 212 |
|---|---|---|---|
| B | 1 | 1 | 1 |
| C | 2 | 2 | 2 |
| D | 2 | Information not sent | ∞ |
| E | 3 | Information not sent | ∞ |
| X | 4 | Information not sent | ∞ |

FIG. 2a

| DESTINATION 204 | NEXT HOP 206 | COST 208 |
|---|---|---|
| A | A | 2 |
| C | E | 3 |
| B | A | 3 |
| E | E | 1 |
| X | X | 2 |

FIG. 2b

COMPUTING REPAIR PATH INFORMATION

FIELD OF THE INVENTION

The present disclosure relates generally to computing repair paths in networks. The disclosure relates more specifically to computing repair path information around a failure component in a data communication network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone lines, wires or cables, or optical lines) and nodes (for example, switches or routers directing the packet along one or more of a plurality of links connected to the switches or routers) according to one of various routing protocols.

One class of routing protocol comprises Routing Vector Protocols according to which the path to a network destination is determined based on a reachability metric. One such protocol comprises a distance vector protocol such as the Routing Information Protocol (RIP) which is described in Internet Engineering Task Force (IETF) Request for Comments (RFC) 1058 and 1723.

A problem that arises with routing vector protocols such as RIP is that if a component fails in the network then packets may be lost while the network converges on a changed topology. For example if node A fails then according to normal forwarding, until node B has updated its forwarding information base, it will forward packets for nodes A and D to node A and those packets will be lost.

One solution that has been proposed to this problem is described in co-pending patent application Ser. No. 11/526,933 filed 25 Sep. 2006, entitled "Forwarding data in a data communications network" of Stewart Bryant et al ("Bryant et al") the entire contents of which are incorporated by reference for all purposes as if fully set forth herein. According to this approach repair paths are computed. However computation of repair paths can be burdensome as large numbers of candidate routes may be available.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2a is a schematic representation of an advertised reachability metric;

FIG. 2b is a schematic representation of a forwarding information base (FIB);

DETAILED DESCRIPTION OF THE PREFERRED EMBODIMENT

An apparatus and method for computing repair path information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method and Apparatus for computing repair path information
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises in various aspects an apparatus and method for computing repair path information around a failure component in a data communications network having as components nodes and links there between. Where, according to a routing protocol, a node sends to a neighbor node a metric indicative of reachability of a destination node and the protocol requires differentiated action by the node if the route to the destination node includes the neighbor node, the apparatus is arranged to compute a repair path to the destination node via candidate nodes comprising only neighbor nodes to the apparatus not requiring differentiated action relative to the apparatus.

In other aspects, the invention encompasses a computer apparatus and a computer-readable medium configured to carry out the foregoing steps.

2.0 Structural and Functional Overview

Figure 1:
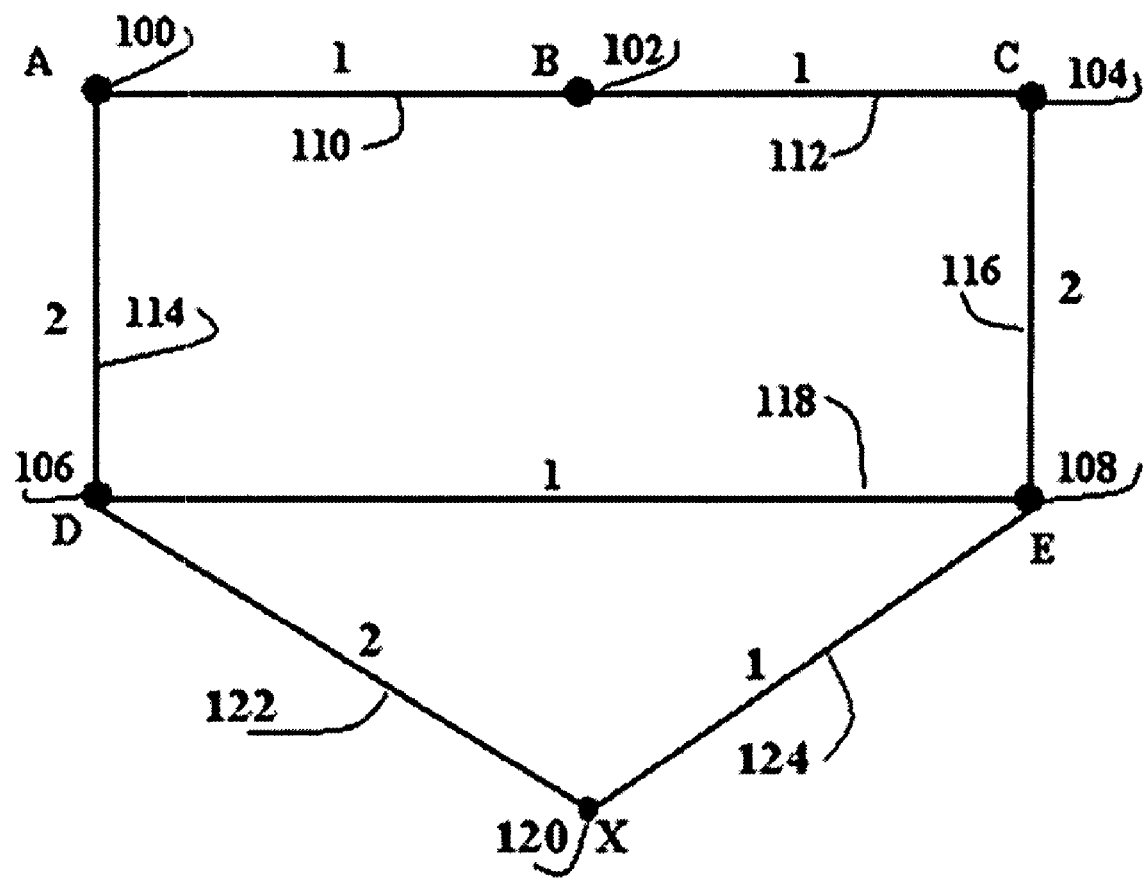
FIG. 1 is a representation of a network for illustrative purposes.

FIG. 1 which is a simple network diagram illustrating RIP. A data communications network includes a plurality of nodes, routers or other appropriate computer apparatus for forwarding data A, B, C, D, E, X, reference numerals 100, 102, 104, 106, 108, 120. Node A is connected to nodes B and D via links 110, 114, node B is connected to node C via link 112, node C is connected to node E via link 116 and node D is connected to node E via link 118. Node X is connected to nodes D and E via links 124, 126. All of the links have a cost of 1 except links 114, 116 and 122 which have cost 2.

In order to forward data to each destination in the network, each node must compute its nexthop on the basis of some form of least cost path. According to RIP, in order for a node in the network to derive this information, each node advertises to its neighbors a reachability metric indicating its cost to each destination. Accordingly, in FIG. 1, for example node A will advertise to nodes B and D its reachability to each of destinations B, C, D, E, X. This information can be seen in FIG. 2a which is a table illustrating the reachability metric advertised by node A to node D having a destination column 200 and a cost column 202. It can be seen that a cost of one is advertised for reaching node B, a cost of two is advertised for reaching nodes C and D, a cost of three for reading node E and a cost of four for reaching node X. Of course only the lowest cost route is advertised. In a similar manner nodes B and D will advertise information to their neighbors which will be based in part upon reachability information that they received. It will be seen that this approach will be iterative as each node receives further information propagated hop by hop through the network. Eventually, however each node converges on a least cost value for each destination.

In addition each node will store the corresponding nexthop, that is, the neighbor node to which it must forward a packet for a given destination along the least cost path. FIG. 2b is a table corresponding to the forwarding information base (FIB) stored at node D once it has converged and based on the information received from its neighbors. In particular the FIB includes a destination column 204 and a nexthop column 206. In addition, column 208 shows the cost of reaching each destination although it will be noted that in practice this information may not be stored in the FIB but is shown here for the purposes of comprehension. Hence it will be seen that if node D receives a packet for destination A then its nexthop is of course node A and similarly for node B. If a packet is received at node D with destination node B then the nexthop is node A as the cost via node E would be higher. Similarly for a packet destined for node E the nexthop is node C and so forth.

In addition, to reduce the occurrence of neighbour nodes sending each other repeated advertisements with increasing cost values for a given destination—the so-called counting to infinity problem and hence reduce convergence time distance vector protocols often incorporate "split horizon". According to this approach a node will not send reachability information back to a router from which that reachability information was learned. In another variant, "split horizon with poisoned reverse", a node will advertise reachability information back to a node from which it received that information, but with an unreachable (infinite) metric. Referring again to FIG. 2a, in the case of split horizon, node A would not advertise reachability information for destinations D, E, X as shown in column 210. In the case of split horizon with poison reverse, node A would advertise these destinations with cost infinity as shown in column 212.

In overview the method and apparatus described herein allow computation of repair path information for example by a repairing node around a failure component such as an adjacent link or node and a routing protocol such as a distance vector protocol employing differentiated action such as split horizon or split horizon with poisoned reverse when sending a reachability metric for a designation node back to a neighbor node along the route to the destination node.

The approach recognizes that repair paths can be computed from loop free alternates (LFA) comprising neighbor nodes to a repairing node that have a cost to a destination node that is less than the cost of the neighbor node to the repairing node plus the cost from the repairing node to the destination node. For example referring to FIG. 1, node X is an LFA for node D with respect to destination node E as the cost from node X to node E, cost 1, is less than the cost from node X to node D, cost 2, plus the cost from node D to node E, cost 1. It is found that a significant fraction of repairs can be executed using LFAs.

The approach described herein further recognizes that the computational burden can be reduced by excluding neighbor nodes as LFA candidates where it can be deduced that they cannot be LFAs. In particular it will be seen that any neighbor node that implements differentiated action when sending its reachability metric to a repairing node, for example suppressing sending its reachability metric in the case of split horizon or sending a reachability metric indicative of unreachability, for example value infinity, in the case of split horizon with poison reverse, cannot be a LFA as the condition for employing the differentiated action is that the route to the destination node is via the repairing node, that is, the neighbor node is further away.

Accordingly the approach described herein ensures that a repairing node is arranged to compute a repair path, for example using an LFA, to a destination node via candidate nodes comprising only neighbor nodes to the repairing node not requiring differentiated action relative to the repairing node. The repairing node only need consider as candidates neighbors that provide a reachability metric, or a reachable reachability metric in the case of split horizon with poisoned reverse. Hence additional computation is not required to exclude non LFA neighbor nodes.

In addition as discussed in more detail below the distance vector protocol can be simulated to identify candidate nodes for LFAs whereas normal routes can be computed using an alternative protocol such as intermediate system-intermediate system (IS-IS) or open shortest path first (OSPF).

Yet further the approach can be implemented in conjunction with other repair schemes allowing said other repair schemes to be implemented only where an LFA is unavailable.

Hence LFAs can be calculated for distance vector protocols such as interior gateway protocols (IGPs) using information inherently available from the split horizon/split horizon with poisoned reverse approach, reducing the computational burden of finding LFA repair paths and minimizing the need for additional repair schemes. Of course when split horizon/split horizon with poison reverse is not in use LFAs can be computed as using the available cost information from the reachability metrics.

3.0 Method and Apparatus for Computing Repair Path Information

Figure 3:
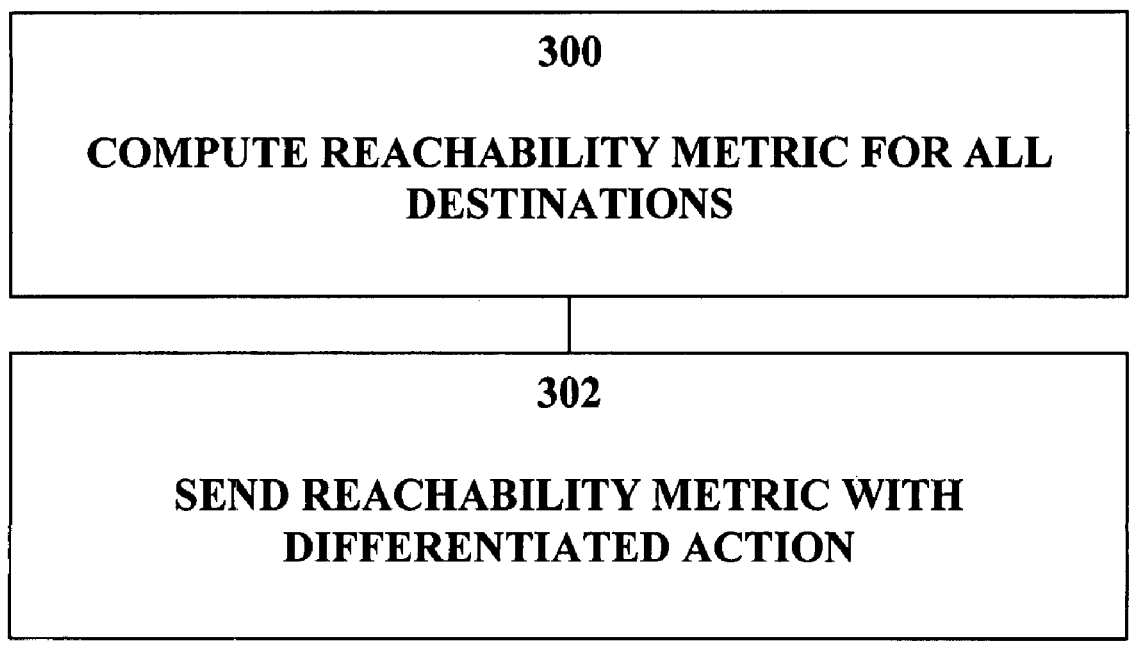
FIG. 3 is a flow diagram illustrating steps performed at a neighbor node according to the method described herein.

The approach described herein is described in more detail with reference to FIG. 3 which is a flow diagram illustrating steps performed at a neighbor node such as node A in relation to a repairing node such as node D. At step 300, according to any appropriate distance vector approach, the neighbor node computes a reachability metric for all destinations, based on the information that it itself has received in reachability metric information from its neighbor nodes.

At step 302 node A applies differentiated action in relation to sending on its own reachability metric as computed in step 300. For example in the case of destination node E then node A will have received the reachability information from node D and hence, apply differentiated action in relation to node D for this destination node. As described above, according to the distance vector protocol the differentiated action may comprise suppression of sending the reachability metric to the destination node E to node D in the case of split horizon or sending it with an unreachable value such as infinity in the case of split horizon with poisoned reverse.

Figure 4:
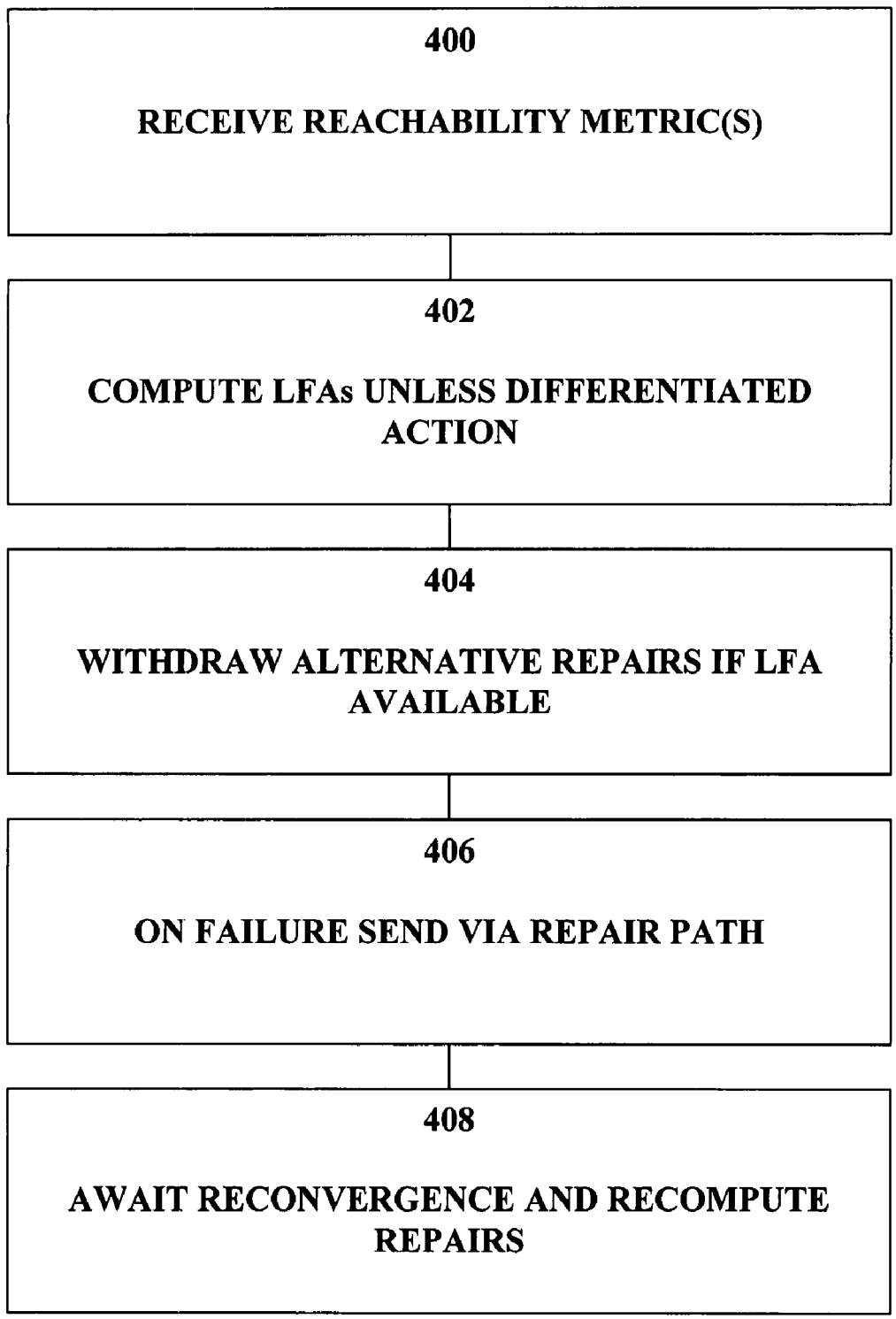
FIG. 4 is a flow diagram illustrating the steps performed at a repairing node according to the method described herein.

Referring now to FIG. 4, which is a flow diagram illustrating steps performed at a repairing node D, at step 400 reachability metrics are received from each of its neighbor nodes. At step 402 the repairing node computes its repair paths from LFA candidates not including nodes which have applied differentiated action, for example node A in relation to destination node E. This can be implemented, for example, by only considering as candidates neighbors who have sent a reachability metric in relation to the relevant destination in the case of split horizon, or excluding as candidates nodes who have sent an unreachable metric in relation to a destination, for example infinity, in the case of split horizon with poisoned reverse.

According to a further optional aspect of the approach an additional repair may be implemented. In this case the repair scheme need only be implemented in the case where an LFA is not available. Accordingly, at step 404, where an LFA is available, alternative repairs can be withdrawn or not computed/distributed in the first place.

One implementation of this for example, is in the case where "not via" addresses are implemented as a repair scheme. The use of "notvia addresses" for creating repair paths is described, for example in co-pending patent application Ser. No. 11/064,275, filed Feb. 22, 2005, entitled "Method and Apparatus for Constructing a Repair Path around a non-available Component in a Data Communications Network" of Michael Shand et al, ("Shand et al") the entire contents of which are incorporated by reference for all purposes and if fully set forth herein.

The use of not via addresses in a network implementing a routing vector protocol such as a distance vector protocol is described, for example, in Bryant et al. According to that approach, with reference once again to FIG. 1, in order to repair a failure in the network each node adjacent to the failure acting as instigating repair node computes a repair or backup path around the failure. Then when a failure is detected an instigating repair node will forward subsequent packets which otherwise would have traversed the failure, via the repair path to a receiving repair node. For example where link 110 fails between node A and B and node A detects the failure then packets subsequently received for node B or node C, which otherwise would have gone via link 110, are forwarded according to the pre-computed repair path via nodes D, E and if necessary C. This approach is sometimes termed fast reroute.

The manner in which the repair path is constructed and propagated is by giving each node/interface (ie its connection to each link to adjacent nodes), in addition to its normal address, a repair address which is capable of propagation and is reachable via a repair path notvia the failure component, sometimes termed a "notvia address". For example node D may have repair addresses D notvia A (represented here as Da) and D notvia C (Dc). Each other node will have computed its nexthop for each of the notvia addresses. Hence when node A detects failure of link 114 it tunnels subsequent packets for node D to address Da for which its nexthop is node D. Node D, having precomputed its nexthop for Da will forward the packet to node C and so forth. It will be noted that node A can forward the packet to Da in any appropriate way for example by tunneling it to that address. Similarly any packets received at node A for node E will also be tunneled to Da. Upon decapsulation of the packet at node D it will then be forwarded normally from node D to node E following the original path.

According to the approach described herein, however, if an LFA is available from, for example, node A then it can signal to the relevant neighbor that the LFA is available such that the neighbor can withdraw the not via address to node A and only restore it when it receives a signal indicating that the LFA is no longer viable. It will be seen that this approach reduces the number of "not via" repairs required.

Reverting to the flow diagram of FIG. 4 at step 406, upon detection of failure of an adjacent component such as a node or link, the repairing node, node D will send packets for a destination which would have traversed the failure component via the repair path to that destination. For example in the case of failure of link 118 between nodes D and E in FIG. 1 node D will send packets to node X, a valid LFA candidate. It will seen that if node D had sent packets for node E to a non LFA node such as node A then packets would loop back to node D if node A has not yet become aware of the failure and recomputed its forwarding information.

At step 408 the repairing node A awaits reconvergence of the network taking into account the failed link before recomputing its repairs. It will be seen that the mechanism described herein requires the network to stabilize before a neighbor can be assumed to be an LFA. Accordingly node A can await some predetermined time after detecting a cost change, the time being computed to be longer than any possible reconvergence time, prior to determining who the LFA repairing neighbors are in the new topology.

It will be seen that the distance vector protocol can be applied in order to compute LFAs but that normal forwarding next hop calculation can be performed using another protocol for example a normal IGP approach such as a link-state protocol. Alternatively again each protocol can emulate a distance vector protocol such as RIP to derive the LFA candidates as described above.

In the case that split horizon with or without poisoned reverse is not implemented then the availability of LFAs can still be computed as each node knows its own cost to a given destination (by definition in a distance vector protocol) as well as its neighbors' costs to itself and the destination such that it has all the information it needs to determine whether a neighbor node is a LFA.

Although the example expressed above is described in relation to link repair, that is where the failure component is a link between adjacent nodes, alternatively the approach can be adopted in the case of node repair, that is, the failure of an adjacent node. In that case the repairing node may identify whether its adjacent nodes provide a downstream route to a destination, where a downstream route is provided by a neighbor node where to the cost from the neighbor node to the destination is less than the cost from the repairing node to the destination. Downstream routes are hence a subset of LFAs.

This may be further understood with reference to FIG. 1, considering node D as the link repairing node and node C as destination node in the event of failure of node E. In that case node X is an LFA (cost to node C=3, <cost to node D+cost from node D to node C=5. Node A is clearly an LFA (cost A to C=2<cost A to D to C=5) and is also a downstream route (cost A to C=2<cost D to C=3). However node X is not a downstream route as cost X to C=3 is not less than cost D to C=3. Accordingly if node E fails, node X will attempt to send LFA repair packets from node D back to D, causing a loop. By selecting node A, a downstream route repair, if node E fails packets will still successfully be repaired to node C.

It will be recognized that the approach described herein can be implemented in any appropriate network or environment using any appropriate distance or path vector protocol in which neighbors exchange reachability metrics and apply differentiated action. The manner in which the method is described herein is implemented maybe using software, firmware, hardware or any combination thereof and with any appropriate code or configuration changes as will be apparent to the skilled reader without the need for detailed description here. For example any appropriate mechanism can be implemented for identifying LFA non-candidates and updating and implementing the forwarding tables in relation to repair paths appropriately.

4.0 Implementation Mechanisms—Hardware Overview

Figure 5:
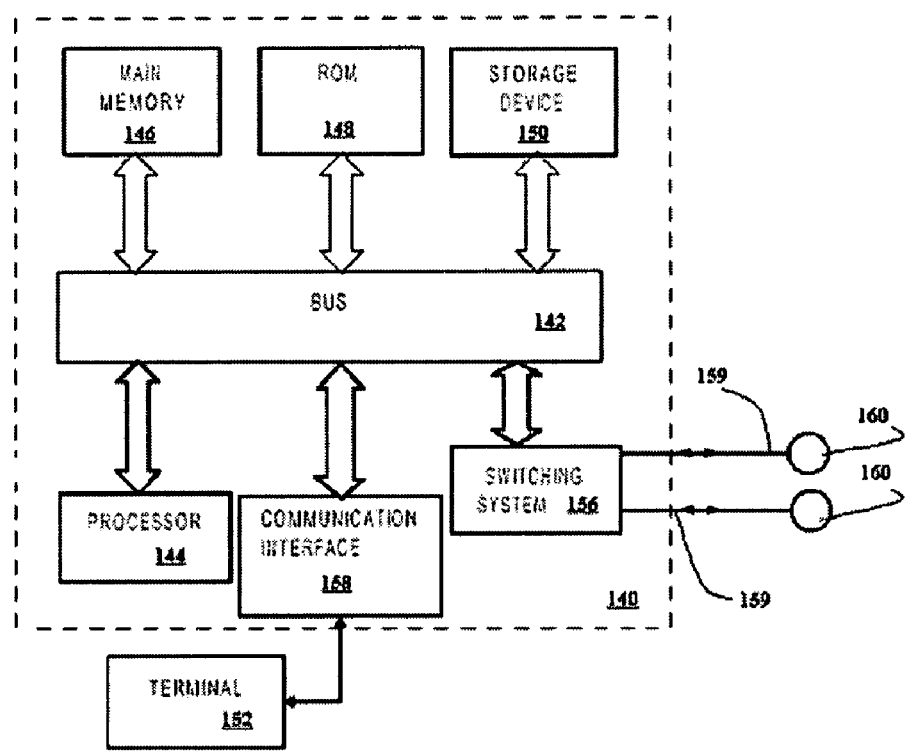
FIG. 5 is a block diagram that illustrates a computer system upon which the method described herein may be implemented.

FIG. 5 is a block diagram that illustrates a computer system 40 upon which the method may be implemented. The method is implemented using one or more computer programs running on a network element such as a router device. Thus, in this embodiment, the computer system 140 is a router.

The computer system 140 implements as a router acting as a repair instigating, repair receiving or repair path node the above described method of forwarding data. Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a repairing node or neighbor node the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It will be appreciated that the approaches described herein can be implemented in relation to any appropriate distance vector routing protocols including routing information protocol (RIP), internet gateway routing protocol (IGRP) and so forth. In addition the approach as described herein can be implemented in relation to other appropriate routing vector protocols such as path vector protocols. The approach can be used in relation to various types of candidate repair paths including LFAs, downstream paths and feasible successors.

Furthermore, although repair paths are pre-computed in the discussion above, alternatively they can be computed "on-the-fly".

What is claimed is:

1. An apparatus for computing repair path information around a failure component in a data communication network having as components nodes and links there between, the apparatus comprising:
   A processor and one or more storage media encoded with logic for execution and which when executed is configured to:
   perform a routing protocol including sending to a neighbor node a metric indicative of reachability of a destination node, and performing differentiated action if the route to the destination node includes the neighbor node, wherein the differentiated action comprises a split horizon or a split horizon with poisoned reverse;
   compute a repair path to the destination node via candidate nodes comprising only neighbor nodes to the apparatus requiring that not require the differentiated action relative to the apparatus and not comprising neighbor nodes that require the differentiated action relative to the apparatus; and
   store the repair path for use in routing data around the failure component.

2. An apparatus as claimed in claim 1 arranged to receive a reachability metric from one of the neighbor nodes.

3. An apparatus as claimed in claim 1 wherein the logic is configured to perform the differentiated action by suppressing sending a reachability metric.

4. An apparatus as claimed in claim 1 wherein the logic is configured to perform the differentiated action by sending a reachability metric indicative of unreachability.

5. An apparatus as claimed in claim 1 wherein the logic is configured to simulate the routing protocol to identify nodes requiring differentiated action.

6. An apparatus as claimed in claim 5 wherein the logic is configured to forward non-repair traffic via a route computed by an alternative routing protocol.

7. An apparatus as claimed in claim 1 in which the routing protocol comprises one of a distance vector, path vector or routing vector protocol.

8. An apparatus as claimed in claim 7 in which the reachability metric comprises a cost metric.

9. An apparatus as claimed in claim 7 in which the candidate neighbor node comprises one of a loop free alternate, downstream route or feasible successor.

10. An apparatus as claimed in claim 1 wherein the logic is further configured to forward data, upon failure of a neighbor node, to a repair address reachable by a repair path not via the failure component.

11. An apparatus as claimed in claim 10 wherein the logic is configured to propagate the repair address to other network components and wherein the logic is configured to suppress propagation of the repair address if a repair path is computable from candidate nodes not requiring differentiated action relative to the apparatus.

12. An apparatus as claimed in claim 1 wherein the logic is further configured to select a candidate node for a repair path and, upon failure of a failure component, send data which would have traversed the failure component via the selected candidate.

13. An apparatus as claimed in claim 12 wherein the logic is further configured to re-compute repair paths once a convergence condition is met subsequent to failure of the failure component.

14. An apparatus for computing repair path information around a failure component in a data communication network having as components nodes and links there between, the apparatus comprising:
   means for performing a routing protocol including sending to a neighbor node a metric indicative of reachability of a destination node, and performing differentiated action if the route to the destination node includes the neighbor node, wherein the differentiated action comprises a split horizon or a split horizon with poisoned reverse;
   means for computing a repair path to the destination node via candidate nodes comprising only neighbor nodes to the apparatus that not require the differentiated action relative to the apparatus and not comprising neighbor nodes that require the differentiated action relative to the apparatus; and
   means for storing the repair path for use in routing data around the failure component.

15. An apparatus as claimed in claim 14 further comprising means for forwarding data, upon failure of a neighbor node, to a repair address reachable by a repair path not via the failure component.

16. An apparatus as claimed in claim 14 wherein the logic is configured to propagate the repair address to other network components and further comprising means for suppressing propagation of the repair address if a repair path is computable from candidate nodes not requiring differentiated action relative to the apparatus.

17. An apparatus as claimed in claim 14 further comprising means for selecting a candidate node for a repair path and for sending, upon failure of a failure component, data which would have traversed the failure component via the selected candidate.

18. A method of computing repair path information around a failure component in a data communications network having as components nodes and links between the nodes, wherein one or more of the nodes execute a routing protocol wherein a node sends to a neighbor node a metric indicative of reachability of a destination node, and wherein the node performs differentiated action if the route to the destination node includes the neighbor node, the method comprising:
   a processor identifying as candidate nodes for a repair path to a destination node only neighbor nodes not requiring differentiated action, wherein the differentiated action comprises a split horizon or a split horizon with poisoned reverse;

the processor computing a repair path via an identified candidate node;

the processor storing the repair path for use in routing data around the failure component.

19. The method of claim 18, further comprising forwarding data, upon failure of a neighbor node, to a repair address reachable by a repair path not via the failure component.

20. The method of claim 18, wherein the repair address is propagated to other network components, and further comprising suppressing propagation of the repair address if a repair path is computable from candidate nodes not requiring differentiated action relative to the apparatus.

21. The method of claim 18, further comprising selecting a candidate node for a repair path and for sending, upon failure of a failure component, data which would have traversed the failure component via the selected candidate.

22. A computer readable storage medium comprising one or more sequences of instructions for computing repair path information around a failure component in a data communications network having as components nodes and links between the nodes, wherein one or more of the nodes execute a routing protocol wherein a node sends to a neighbor node a metric indicative of reachability of a destination node, and wherein the node performs differentiated action if the route to the destination node includes the neighbor node, and which instructions, when executed by one or more processors, cause the one or more processors to perform the steps of:

identifying as candidate nodes for a repair path to a destination node only neighbor nodes not requiring differentiated action, wherein the differentiated action comprises a split horizon or a split horizon with poisoned reverse;

computing a repair path via an identified candidate node;

storing the repair path for use in routing data around the failure component.

* * * * *